April 25, 1950          O. M. BRAATEN          2,504,961
LINEAR DIMENSION MEASURING AND GAUGING MACHINE
Filed Sept. 21, 1945          5 Sheets-Sheet 1
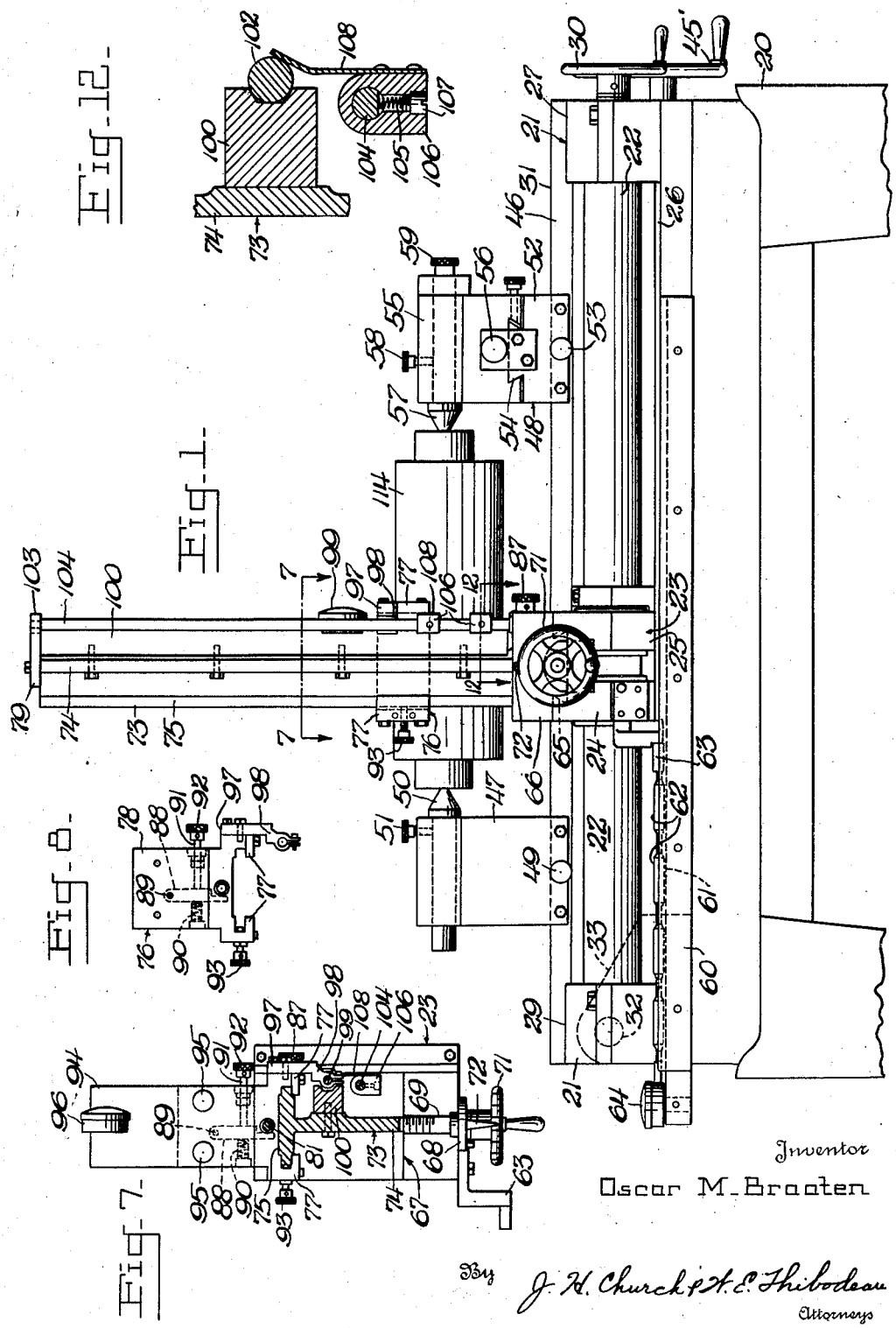
Inventor
Oscar M. Braaten
By J. H. Church & A. E. Thibodeau
Attorneys

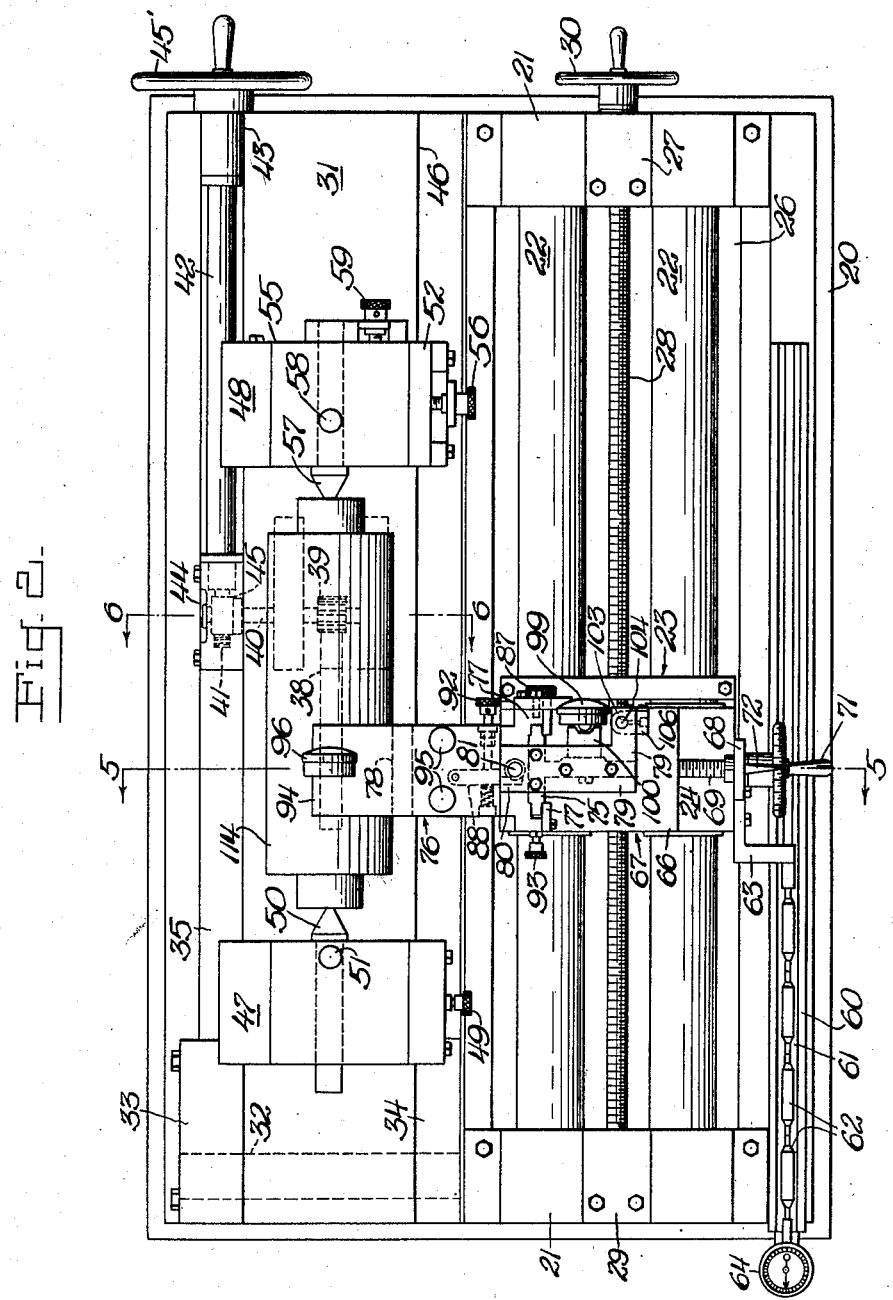

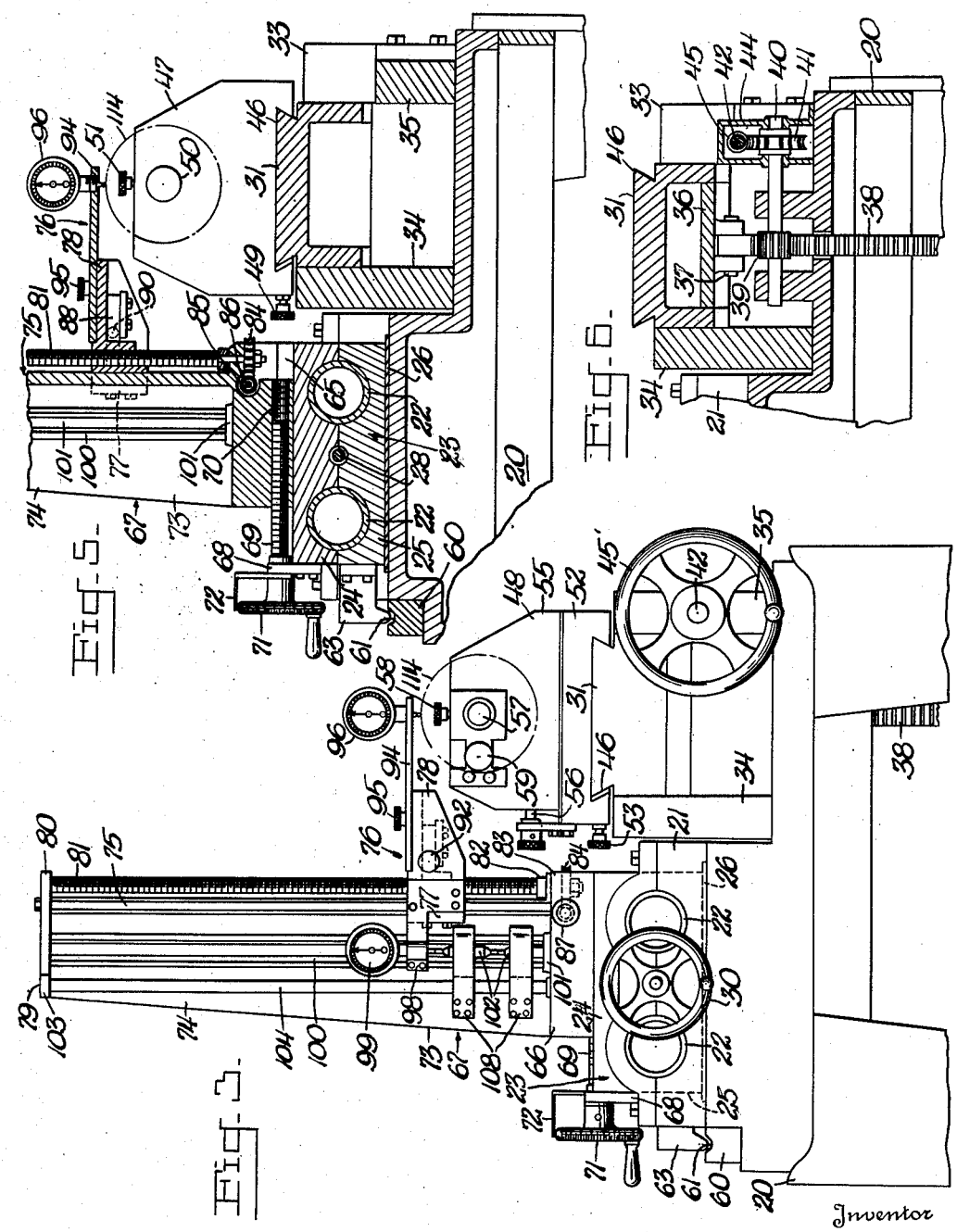

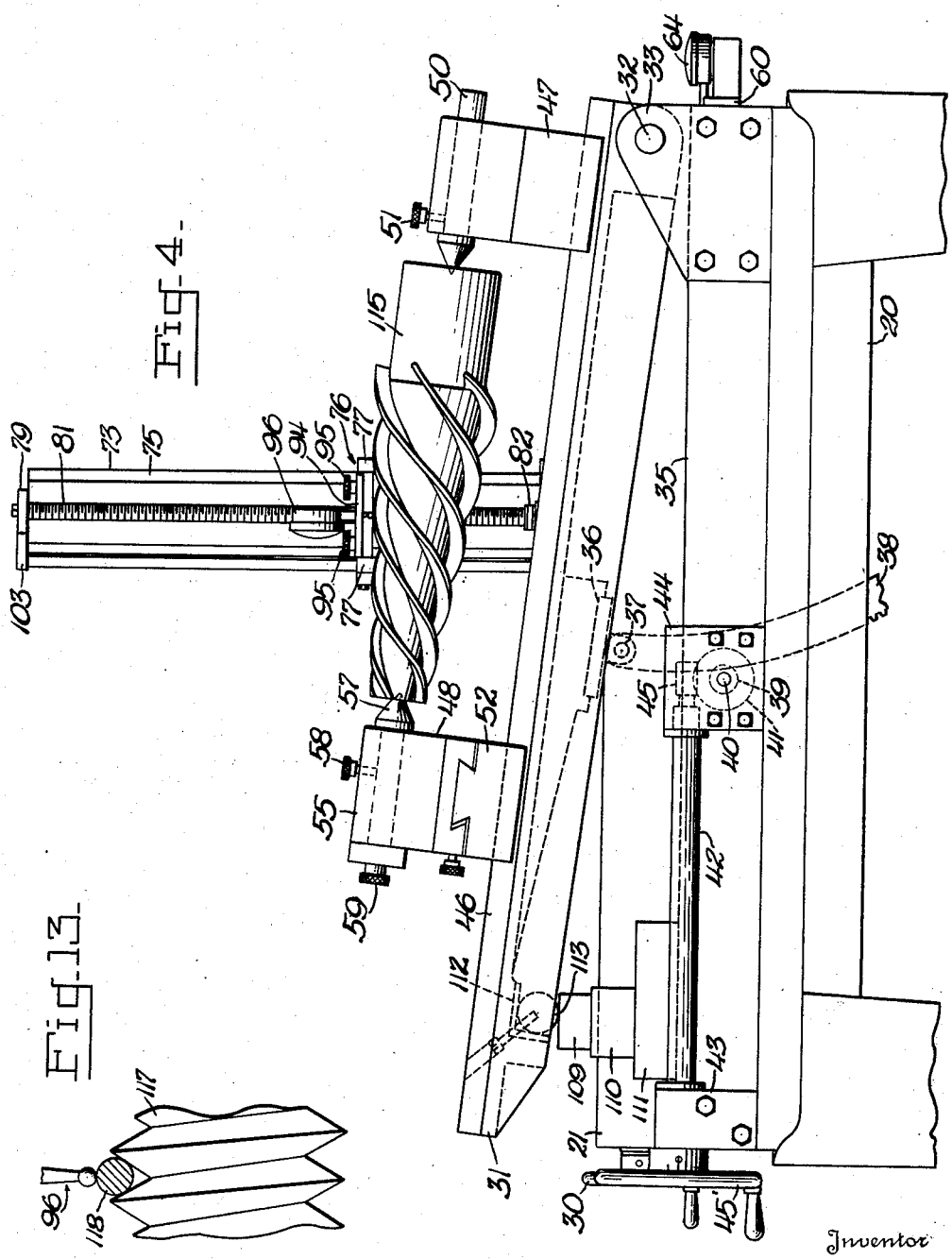

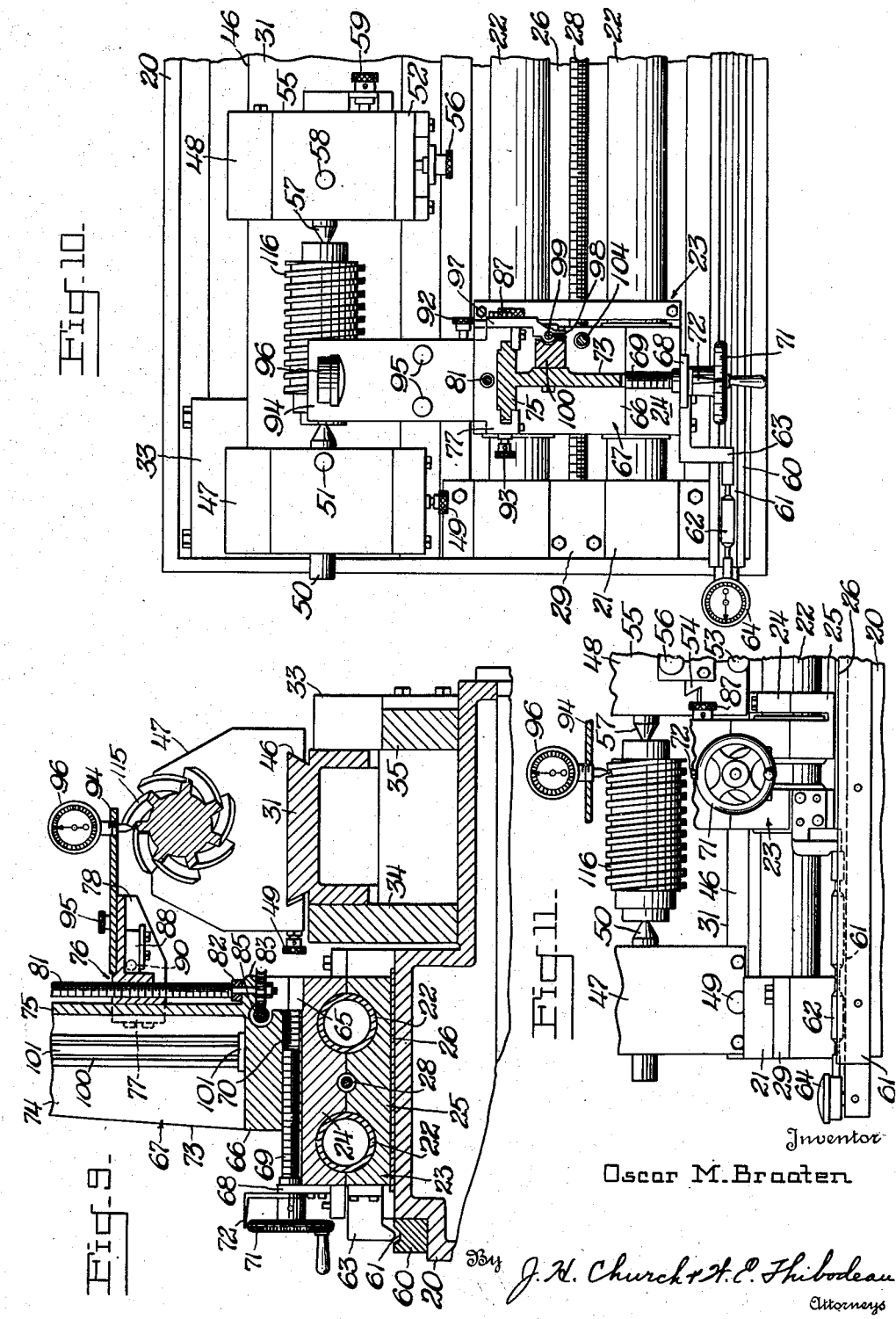

Patented Apr. 25, 1950

2,504,961

UNITED STATES PATENT OFFICE 2,504,961

LINEAR DIMENSION MEASURING AND GAUGING MACHINE

Oscar M. Braaten, Rock Island, Ill.

Application September 21, 1945, Serial No. 617,883

3 Claims. (Cl. 33—174)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a measuring or gaging machine and more particularly to a machine for measuring or gaging the dimensions and angles of machine tools, dies, and like components.

The invention contemplates and has for its principal object the provision of measuring and gaging apparatus that may be universally adapted to the measurement of dimensions and angles in components having such characteristics that have heretofore presented difficult problems to those concerned with precision machine work. For example, it has heretofore been a comparatively arduous task to measure or gage properly the various contours of a tapered and fluted cutter, especially if such cutter was formed with an uneven number of flutes. Likewise the gaging of the pitch and lead of a threaded element has heretofore been accomplished only at the expense of painstaking effort. As will be brought out below, there are several other relatively inefficient and complicated measuring systems that may be eliminated by the use of apparatus constructed according to the present invention.

It is an important object of the invention to provide a machine of the type described having a base and a plurality of units thereon mounted for movement in such a manner that the several dimensions and angles of any type of component may be readily and quickly ascertained.

Another important object is the provision of a combination of indicator means and gaging means by which the measurements made by the units may be immediately read and compared.

Still another important object of the invention is to provide a machine in which the relative phases of adjustment of the different measuring units may be measured or gaged by the use of simple gage elements, such as Johansson blocks.

It is another object of the invention to provide means by which the measuring units may be easily and quickly moved on the base of the machine and to include in at least one of the means a releasable connection permitting release of one of the units for rapid adjustment thereof independently of the adjusting means.

The invention has for another object the provision of channeled members of similar types for use with interchangeable measuring blocks or line bars so that one set of such bars is adapted for use with either channel in the measuring or gaging of the various phases of adjustment of either measuring unit.

Still another object of the invention is to provide a machine of the class described that is simple in construction, compact in arrangement, and efficient in operation.

Other objects and features will become apparent from the following detailed description of a preferred embodiment of the invention as illustrated in the accompanying sheets of drawings in which:

Figs. 1, 2 and 3 are respectively side, plan, and end views of the machine;

Fig. 4 is a side elevation of the machine as viewed from the opposite side and illustrates the use of the sine bar in conjunction with a component having a taper;

Fig. 5 is a transverse sectional view taken on the line 5—5 of Fig. 2;

Fig. 6 is a transverse, fragmentary sectional view taken on the line 6—6 of Fig. 2;

Fig. 7 is a fragmentary sectional view taken on the line 7—7 of Fig. 1;

Fig. 8 is a detail view of the base member of one of the measuring units;

Fig. 9 is a transverse sectional view similar to Fig. 5 but showing the use of the machine in conjunction with the measurement of a different type of component;

Figs. 10 and 11 are respectively plan and side views of end portions of the machine showing the use of the machine in the measurement of a component having a spiral or helix formed thereof, the measuring units being shown in different positions in each figure;

Fig. 12 is a sectional view on an enlarged scale showing the means for retaining the gaging elements or line bars in the vertical channeled member, the view being taken substantially along the line 12—12 of Fig. 1; and Fig. 13 is a diagrammatic illustration indicating the manner in which a measurement is made on a threaded element.

The particular embodiment of the invention chosen for the purposes of illustration comprises a machine including a base or platform 20 provided at opposite ends at one side thereof with longitudinally spaced supporting brackets 21. These brackets serve to carry a pair of longitudinally extending guide members preferably in the form of tubes 22. The tubes 22 serve to carry for movement longitudinally of the base 20 a first measuring unit designated generally by the numeral 23. As best shown in Fig. 5 the unit 23 includes upper and lower halves 24 and 25 secured together to embrace the tubes 22. The unit 23 may be further guided and supported by the provision of a secondary bearing surface formed on a longitudinally extending steel plate 26 disposed below the tubes 22 and adapted to engage the under surface of the lower half 25 of the unit 23. By the means just described the unit 23 is adapted for free movement longitudinally of the base.

The bracket 21 at the right-hand end of the machine includes a bearing 27 which journals the shank of a longitudinally extending adjusting screw 28. The screw is threaded through a threaded bore formed longitudinally in the unit 23 and has its opposite end formed as a shank carried in a bearing 29 in the bracket 21 at the left-hand end of the machine. A handwheel 30 is provided at the right-hand end of the shaft 28 for the purpose of rotating the shaft so that the unit 23 may be adjusted on the tubes 22 and plate 26 longitudinally of the base 20.

As best shown in Figs. 2 and 4, the opposite side of the base 20 serves to support a longitudinally extending sine bar 31. The sine bar is provided at its left-hand end (as viewed in Figs. 1 and 2) with mounting means including a transverse pivot pin 32 carried at one end in a bracket 33 and at its other end in a longitudinally extending supporting member 34. A second member 35 corresponding generally to the member 34 parallels the latter and extends longitudinally along the other side of the sine bar 31. Intermediate its ends the sine bar is provided with bracket structure 36 including a transverse pivot 37 to which is attached the upper end of a rack 38 forming part of the means for adjusting the sine bar vertically about its pivot 32 through various angles with respect to the base 20. The rack 38 is operated by a pinion 39 carried on a transverse shaft 40 to which is keyed a worm wheel 41. A longitudinally extending shaft 42 is journaled at one end in a bearing 43 on the base 20 and is journaled at its other end in a bearing formed in a gear box 44 mounted on the base 20 through the medium of the longitudinally extending supporting member 35. The gear box 44 encloses the worm wheel 41 and a worm 45 keyed to the enclosed end of the adjusting shaft 42. A handwheel 45' provides means by which the shaft 42 may be rotated to effect adjustment of the sine bar 31 through the medium of the means 38—41.

As best shown in Figs. 5 and 9, the upper portion of the sine bar 31 is provided with a longitudinal way 46. This way provides means by which the sine bar may bear supporting means for carrying a component to be measured.

As best shown in Figs. 1 and 4, the supporting means for such component comprises a pair of centering units 47 and 48. The unit 47 is adjustable longitudinally along the way 46 on the sine bar 31 and may be secured in any position of adjustment by means of a securing member 49. The upper portion of the unit 47 carries a center spindle 50 which is mounted in the unit 47 for adjustment longitudinally thereof. A locking member in the form of a hand screw 51 serves as means for locking the spindle to the unit 47. The unit 48 includes a lower section 52 carried by the way 46 of the sine bar 31 for longitudinal adjustment, a locking screw 53 being provided for the purpose of locking the unit in any position of longitudinal adjustment. The section 52 includes a transverse way 54 on which is carried for transverse adjustment an upper section 55 of the unit. An adjusting member 56 cooperates between the section 55 and the section 52 for effecting transverse adjustment. The upper section 55 carries a longitudinal centering spindle 57 which is adjustably positionable in the section and may be locked in position by means of a locking member 58. The transverse adjustment 56 has been provided to accommodate the possibility that through wear or otherwise the spindle 57 may become misaligned. As a further expedient to facilitate realignment of the spindle 57, any conventional means may be provided, if desired, for adjusting the spindle horizontally, such means being indicated generally herein as including an adjusting knob 59.

The machine is provided with means for gaging and measuring the various positions of the longitudinally movable measuring unit 23. In a preferred form of the invention this means takes the form of a longitudinally extending bar or member 60 carried at one side of the base 20 below the unit 23. As best shown in Fig. 5, the member 60 is provided along its upper edge with a channel 61 which serves to support a selected plurality of gage elements or blocks in the form of line bars 62. An abutment or extension 63 is secured to the outer face of the lower section 25 of the unit 23 and includes a portion depending into the channel 61 of the bar 60 so that the end of the series of line bars 62 may be contacted by the unit 23. The member 60 has mounted at its extreme end measuring means preferably in the form of a dial indicator 64.

The upper section 24 of the measuring unit 23 is provided with a transverse way 65 which serves to carry a base member 66 of a second or transversely adjustable measuring unit indicated generally by the numeral 67. The outer longitudinal edge of the upper section 24 of the unit 23 includes a support 68 forming a bearing for a transverse, threaded adjusting shaft or screw 69 which is threaded into a threaded bore 70 in the base member 66 of the unit 67. A suitable handwheel 71 is keyed or otherwise secured to the shaft 69 and provides means by which the unit 67 may be moved transversely of the base 20. The bracket 68 carries an indicator in the form of a pointer 72 cooperable with graduations marked about the periphery of the handwheel 71.

The unit 67 is provided with a vertical columnar structure 73 preferably formed integral with the base 66 of the unit 67 and having a T cross section (Fig. 7), the leg portion of which is indicated at 74 and the cross portion of which is designated by the numeral 75. The portion 75 of the column provides a supporting guide for a vertically movable, third measuring unit indicated generally by the numeral 76. This unit includes a pair of guide portions 77 embracing opposite edges of the guide formed by the cross portion 75 of the column and a supporting portion 78 extending laterally away from the column toward the sine bar 31. The top of the column is provided with a bracket 79 provided at one end with a bearing 80 in which is supported the upper end of a vertical, threaded shaft or screw 81. The lower end of the shaft 81 is reduced and passes through a thrust bearing 82 into a bearing 83 formed in the base 66 of the unit 67. This portion of the shaft carries a worm wheel 84 meshing with a worm 85 keyed to the inner end of a stub shaft 86, see Figure 5, which has secured thereto outside the base member 66 an operating knob 87.

As best shown in Figs. 7 and 8, the vertical shaft or screw 81 passes loosely through the portion 78 of the unit 76. Means are provided by which the unit 76 may be releasably connected to the threaded shaft 81 so that the unit may be adjusted vertically by rotation of the shaft through the medium of the operating knob 87. This means takes the form of a latch member 88 pivoted at 89 to the portion 78 of the unit 76 and normally spring-pressed by a compression spring 90 into engagement with the threaded shaft 81. A release member in the form of a threaded shaft 91, having an operating knob 92, is carried by the portion 78 and is engageable with the latch member 88 at the side thereof opposite the spring 90. When the release member 91 is tightened the latch member 88 is moved out of engagement with the threaded shaft 81 so that the unit 76 may be moved independently of the shaft 81. This means provides for rapid vertical adjustment of the unit 76 and is useful in those cases when it is desired to move the unit 76 quickly out of operating position. One of the guide portions 77 of the unit 76 is provided with a locking member in the form of a knob 93 which may be tightened to secure the unit 76 in position on the column.

The portion 78 of the unit 76 carries thereon and serves to support a laterally extending platform 94 which projects in proximity to the supporting units 47 and 48 and consequently is positionable adjacent a component carried between the centering spindles 50 and 51. The inner end of the platform 94 is removably secured by means of securing elements 95 and the outer end carries a measuring instrument herein shown as a dial indicator 96. As will be hereinafter more fully described, the plunger of the indicator 96 is adapted to contact either of the centering spindles 50 or 51 or any component carried therebetween.

The inner end of the unit 76 is provided with an inwardly directed supporting bracket 97 having a clamping portion 98 adapted to carry removably therein a measuring device in the form of a dial indicator 99. As is best shown in Fig. 7, the clamping portion 98 of the bracket 97 is disposed adjacent a vertical, channeled member 100 secured to the vertical leg portion 74 of the column 73. It will be noted that the channel in the member 100 is similar to the channel 61 formed in the horizontal bar 60 on the base 20. As is best indicated in Fig. 3, the lower portion of the member 100 terminates in a base or anvil 101 on which may be supported a plurality of gage blocks or line bars 102. These blocks or bars are similar or identical to the blocks or bars 62 supportable in the channel of the horizontal member 60 and may form part of the same set of gage blocks. Accordingly the blocks or bars 62 and 102 are interchangeable between the channeled bars 60 and 100. The bars 102 may be so disposed in the member 100 as to contact the plunger of the dial indicator 99 carried by the unit 76. In this manner the various phases of adjustment of the unit 76 may be measured or gaged.

The bracket 79, previously described as being supported at the upper end of the column 73, includes at its inner end a longitudinally directed portion 103 that forms a support for the upper end of a bar or rod 104, the lower end of which is anchored in the base member 66 of the unit 67. As is best shown in Fig. 12, one side of the bar is flattened and is engaged by a compression spring 105 housed in a member 106. A screw 107 serves to retain the spring in the member.

A retainer 108 in the form of a strip of spring metal is secured to the member 106 and extends laterally in proximity to the channel in the vertical member 100. There may be a plurality of such retaining means, each of which is cooperable with the gaging elements 102 in a manner serving to retain these elements in the channeled member 100. Since the vertical rod 104 has its one side flattened, the members 106 may be turned about the rod so that the gaging elements may be selectively removed or inserted. The members 106 may also be moved vertically on the rod for selective positioning thereon.

As previously stated, the sine bar 31 may be adjusted through various angles with respect to the base 20 by means of the adjusting mechanism 38—45. Gage means is provided for the purpose of gaging or measuring the various heights at which the free end of the sine bar may be positioned. These elements are herein indicated as Johansson blocks (although any other suitable means may be employed), there being shown in Fig. 4 a plurality of blocks 109, 110 and 111 mounted on the upper, flat surface of the base 20. The free end of the sine bar is provided at its under surface with a transverse angle member 112 on which is mounted a transverse cylinder 113. The axis of this cylinder is disposed in a plane that parallels the upper surface of the sine bar 31 and that passes through the axis of the pivot pin 32. The radius of the cylinder is a known and constant factor and in conjunction with the gage blocks 109, 110 and 111 serves as part of the means by which the height of the sine bar may be precisely measured.

Figs. 1, 3 and 5 illustrate the use of the machine in the measurement of a cylindrical component 114. As will be hereinafter more fully brought out the function of the machine in this case is such as to check accurately the length, diameter, and cylindricality of the various portions of the cylinder.

Figs. 4 and 9 illustrate the use of the machine in the gaging or measuring of a component such as a spirally fluted cutter 115.

Figs. 10 and 11 illustrate the use of the machine in the gaging or measuring of a component 116 comprising a worm or like element.

Fig. 13 illustrates diagrammatically the measurement or gaging of a threaded element or component 117, there being also indicated in the drawing a gaging element in the form of a wire 118 shown in position between the threaded component 117 and the plunger of the dial 96.

In the following description of the use and operation of the machine in the measuring of a component comprising a cylinder, particular reference will be had to Figs. 1, 3 and 5. Prior to the gaging or measuring of the component 114, it is preferable to check the accuracy of the positions of the centering spindles 50 and 51 in the supporting units 47 and 48 respectively. For this purpose the unit 23 is run down the guiding tubes 22 in proximity to the supporting unit 47. The transversely movable unit 67 is moved inwardly and the vertically movable unit 76 is moved downwardly until the plunger on the dial 96 is exactly coincident with the point of the centering spindle 50. The indicator 96 is preferably of the type in which slight fluctuation of the needle may be used to assist in the ascertaining of the exact center. The dial may be of the type in which the dial face may be rotated with respect to the indicator body so that the zero index may be set in any particular position, depending upon the position of the needle or pointer. After the location of the center of the spindle 50 has been taken, the unit 23 is moved to the right toward the spindle 57. No alteration is made in the positions of the units 67 or 76. The plunger of the indicator 96 is brought into proximity to the point of the centering spindle 57 and a careful check is then made to ascertain that the same reading is obtained with reference to the spindle 57 as was obtained with reference to the spindle 50. In the event that the spindle 57 is not properly aligned, its position may be corrected as heretofore indicated. It should be stated at this point however that the particular mounting of the spindle 57 for adjustment vertically and transversely may be omitted if desired and has been illustrated herein only as an additional expedient. It forms no part of the present invention and has therefore not been illustrated in detail, since it is obvious that such means may take any one of several forms.

The component 114 is mounted on its axis between the spindles 50 and 57. The units 23, 67 and 76 are then adjusted so that the plunger of the dial 96 is positioned at the exact center of the upper surface of the component at one end thereof, and a reading is taken on the dial 96. The unit 23 is then moved to the left and readings are taken at various points along an element of the cylindrical surface. If these readings are the same it will have been determined that the surface is parallel to the axis of the component and further checks about the peripheral surface of the component will indicate whether the component is a perfect cylinder.

The accuracy of the radius of the cylinder may also be determined. It will be known, of course, that the cylinder is to have a certain radius. In the present instance it will be assumed that this radius is two inches. By the use of gage blocks or otherwise the point on the plunger of the dial 96 is set at two inches above the axis of the spindles 50 and 57. Consequently when the point of the plunger on the dial 96 contacts the surface of the cylinder, the reading should be zero, subject to allowable tolerances. The dial 96 may be set in the aforesaid manner by means of gage blocks between the plunger and the upper surface of the sine bar 31. However, another method may be employed, which involves the use of the gage blocks or line bars 102. In this instance the unit 76 is adjusted vertically and the desired line bars 102 are mounted in the vertical channeled member 100 to cooperate with the plunger of the dial indicator 99. The distance between the anvil 101 and the plunger on the dial 99 will be such as to dispose the plunger of the dial 96 at a point two inches (following the presently assumed example) above the axis of the spindles 50 and 57.

The length of the cylinder may be checked by a combination of the functions of the units 76 and 23. The unit 76 having been set in its vertical position by either of the aforesaid methods, the unit 23 is moved longitudinally so that the dial 96 has its plunger disposed at one end of the cylinder. Line bars 62 are then placed in the channel 61 of the horizontal member 60 to fill precisely the space between the dial indicator 64 and the extension 63 on the unit 23. Assuming in the present instance that the cylinder has a length of ten inches, a quantity of line bars 62 equivalent to ten inches is removed from the channeled member 60. The unit 23 is then moved longitudinally until the extension 63 contacts the first remaining line bar, in which case the reading on the dial 64 should be exactly the same as the reading when the unit 23 was at the right-hand end of the cylinder 114. If the length of the cylinder is accurate the point of the plunger of the dial 96 will be precisely at the left-hand end of the cylinder 114.

As best shown in Fig. 4, the machine may be used to check the taper on a tapered component, such as the cutter 115. In the present instance it will be assumed that the taper on the cutter is such that an angle of seven degrees is formed between the axis of the cutter and an element of the cone forming the cutter. In other words the sine bar 31 should be adjusted vertically so that the aforesaid element of the component will be exactly horizontal, in which case the sine bar will form an angle of seven degrees with the base 20. As previously stated, the under surface of the free end of the sine bar is provided with the transverse cylinder 113, which has its axis in a common plane with the axis of the pivot pin 32 at the other end of the sine bar. The design of the sine bar is such that the distance between the center of the pin 32 and the center of the cylinder 113 is a known and constant factor. It will be herein assumed that the distance is thirty inches. Having determined that the sine bar is to be set at angle of seven degrees to the base 20, the distance between the center of the cylinder 113 and a line drawn parallel to the base and passing through the center of the pin 32 will be the sine of this angle, which is 3.6561. Since the radius of the cylinder 113 is also a known and constant factor the amount of the radius will be subtracted from the figure of 3.6561. However the remaining distance will be increased by the distance between the upper surface of the base 20 and the horizontal plane through the axis of the pin 32. In the present case the problem is simplified by the use of the gage block 111 which has its upper surface disposed in the same horizontal plane as the axis of the pin 32. The right triangle thus formed has its hypotenuse extending between the axis of the pin 32 and the axis of the cylinder 113; the shorter leg of the triangle extends from the axis of the cylinder 113 perpendicularly to a point on the upper surface of the gage block 111; and the longer leg of the triangle extends between the last named point and the axis of the pin 32. The blocks 109 and 110, in conjunction with the block 111 and cylinder 113, establish the height to which the sine bar 31 is to be raised. The unit 23 is moved to one end of the cutter and the unit 76 is moved or adjusted vertically downwardly so that the plunger on the dial 96 contacts one end of the cutter. The unit 23 is then moved toward the other end of the cutter and readings are taken at various intervals. These readings should be identical at all points, in which case the taper on the cutter will have been determined to be correct.

Fig. 9 illustrates the use of the machine for the purpose of measuring or gaging the relief on the teeth of the cutter 115. As will be apparent from the illustration, the unit 76 is moved downwardly until the plunger on the dial indicator 96 contacts either the high or low point on a tooth of the cutter. The cutter is then rocked so that the plunger travels between the high and low point and the reading is taken on the indicator 96. Similar checks are made at necessary intervals along each tooth.

It will be noted that the cutter has an uneven number of teeth or flutes. By the use of the present invention, the radius of any circle of the cutter may be easily measured. The procedure to be followed is that set forth above for the checking of the radius of the cylinder 114 namely, with the sine bar 31 horizontally disposed.

There is illustrated in Figs. 10 and 11 the use of the machine in the checking of the pitch and lead of a component formed with a helix, such as the screw or worm element 116. As shown in Fig. 11 the point on the plunger of the dial indicator 96 is set to contact the pitch circle of the helix on the component 116. The correct setting of the position of the unit 76 is made by either of the methods heretofore described in connection with the use of the machine for the checking of the radius of the cylindrical component 114 (Figs. 1 to 5). Repeated checks are made at necessary intervals. The manner of checking the lead of the thread or helix is very similar to that for checking the length of the cylinder 114. The point on the plunger of the dial indicator 96 is set on the pitch line as previously stated (Fig. 11) and the reading is taken on the indicator. Line bars 62 are disposed in the channeled member 60 between the indicator 64 and the extension 63 on the unit 23 and a reading is taken on the indicator 64. Assuming that it is desirable to check the lead over an interval of one inch, a line bar 62 having a length of one inch is removed from the channeled member 60, and the unit 23 is moved longitudinally until the extension 63 contacts the end of the remaining series of line bars, at which point the indicator 64 should show the same reading as it did previously. The unit 76, having been previously moved upwardly to remove the plunger of the indicator 96 from engagement with the helix on the component 116, is now moved downwardly. The plunger should now contact the pitch line of another turn of the helix with the same reading as that obtained previously. In the present instance it will be assumed that the helix makes three turns per inch, in which case the indicator should now be on the pitch line of the third turn away from that engaged by the indicator plunger in Fig. 11. Similar checks are made along the component and in each case the necessary sizes of line bars 62 are removed so that when the check is completed the parts will occupy substantially the positions indicated in Fig. 10.

Fig. 13 illustrates the use of the machine in the gaging of a threaded component such as that designated at 117. It has heretofore been necessary in checking threaded components to use a system employing wires and a micrometer. This system depended upon the use of a pair of wires at one side of the component and a single wire at the diametrically opposed side of the component. Each wire fitted into the V of a thread and the object of the measurement was to determine the distance between the outer surfaces of the wires, since it was impossible to measure diametrically opposed portions of the thread. By the use of the machine constructed according to the present invention, this complicated system of measurement may be eliminated and the gaging may be done simply by the use of a single wire in conjunction with the dial indicator 96. The wire is shown at 118 as being disposed in the V of an upper portion of the threaded component 117. Wires of this type are provided in sizes corresponding to different sizes and types of thread. The proper size of wire is selected and is laid in the V. Since the diameter of the wire is known, the appropriate radius can be computed by use of a conventional formula. For example, assuming that the type of thread to be gaged is 60°, the following formula will be used:

$$\frac{E+3G-\frac{.86602}{N}}{2}=R$$

in which $E$=pitch diameter, $G$=diameter of wire, $N$=number of threads per inch, .86602 is a constant, and $R$=radius from center of component to outside of wire. The unit 76 is adjusted in the manner described for the measurement of a cylinder and the particular reading for the type of thread being checked is made on the dial indicator 96.

It will be seen from the foregoing description that the machine provided by the present invention enables the carrying out of measuring and gaging in a simple and efficient manner. From the few examples illustrated it will be apparent that there may now be easily and readily measured and gaged various contours that heretofore required the use of complicated gages and painstaking effort. In the present instance, a single compact machine is provided for the measurement of the transverse, longitudinal and vertical dimensions, together with the measurement and checking of various angles. Other uses of the machine for the checking and gaging of other types of components will appear to those skilled in the art.

It should be understood, of course, that the foregoing disclosure relates to only a preferred embodiment of the invention and that numerous modifications and alterations may be made therein without departing from the spirit and scope of the invention as set forth in the appended claims.

I claim:

1. A machine of the class described, comprising a base, a sine bar arranged longitudinally of said base, means mounting said sine bar on said base for adjustment vertically through various angles with respect to said base, means for setting said sine bar at selected angles, means on said sine bar for supporting a component to be measured, a first unit mounted on said base for adjustment longitudinally with respect to said base, sine bar and component, a member carried by and disposed longitudinally of said base and formed with a longitudinal channel, means including gage blocks supportable in said channel for measuring phases of adjustment of said first unit, means including a column structure on said first unit, a second unit carried by said column structure for adjustment vertically with respect to said base, sine bar and component and including a portion adapted to contact said component, a vertically disposed member associated with said column structure and including a vertical channel, and means including gage blocks similar to the aforesaid blocks and supportable in said vertical channel for measuring phases of vertical adjustment of said second unit.

2. A machine of the class described, comprising a base, a sine bar arranged longitudinally of said base, means mounting said sine bar on said base for adjustment vertically through various angles with respect to said base, means for setting said sine bar at selected angles, means on said sine bar for supporting a component to be measured, a first unit mounted on said base for adjustment longitudinally with respect to said base, sine bar and component, a member carried by and disposed longitudinally of said base, means including measuring elements supportable on said member for measuring phases of adjustment of said first unit, means including a column structure on said first unit, a second unit carried by said column structure for adjustment vertically with respect to said base, sine bar and component and including a portion adapted to contact said component, a vertically disposed member associated with said column structure, and means including measuring elements similar to the aforesaid measuring elements and supportable by said vertical member for measuring phases of vertical adjustment of said second unit.

3. A machine of the class described, comprising a base, a sine bar arranged longitudinally of said base, means mounting said sine bar on said base for adjustment vertically through various angles with respect to said base, means including a rack and pinion for adjusting said sine bar, means on said sine bar for supporting a component to be measured, a longitudinally movable unit carried by said base for longitudinal adjustment with respect to said base, sine bar and component, a transversely movable unit carried by said longitudinally movable unit for transverse adjustment with respect to said base, sine bar and component, a vertically movable unit carried by said transversely movable unit for adjustment vertically with respect to said base, sine bar and component and including a portion adapted to contact the component, means for adjusting said vertically movable unit, and releasable means between said vertically movable unit and its adjusting means for releasing said vertically movable unit independent of said adjusting means.

OSCAR M. BRAATEN.

REFERENCES CITED

The following references are of record in the file of this patent:

UNITED STATES PATENTS

| Number | Name | Date |
| --- | --- | --- |
| 226,723 | Davidson | Apr. 20, 1880 |
| 1,007,185 | Craley | Oct. 31, 1911 |
| 1,366,396 | Loeffler | Jan. 25, 1921 |
| 1,476,573 | Allen | Dec. 4, 1923 |
| 1,482,390 | Eden | Feb. 5, 1924 |
| 1,670,906 | Simmons | May 22, 1928 |
| 2,158,649 | Armitage | May 16, 1939 |
| 2,171,589 | Miller | Sept. 5, 1939 |
| 2,185,630 | Fridlund | Jan. 2, 1940 |
| 2,195,820 | Matchett | Apr. 2, 1940 |
| 2,309,142 | Stafford | Jan. 26, 1943 |
| 2,317,226 | Seyferth | Apr. 20, 1943 |
| 2,351,773 | Lovenston | June 20, 1944 |
| 2,359,018 | Balk | Sept. 26, 1944 |

FOREIGN PATENTS

| Number | Country | Date |
| --- | --- | --- |
| 328,840 | Germany | Nov. 11, 1920 |

OTHER REFERENCES

Page 150, American Machinist, July 19, 1945, a magazine published by McGraw Hill Publishing Co. 330 West 42nd Street, New York 18, N. Y.